United States Patent
Slater

Patent Number: 6,124,928
Date of Patent: Sep. 26, 2000

[54] METHODS AND APPARATUS FOR OBTAINING A SELECTIVELY POLARIZED INDUCED EMISSION

[75] Inventor: Joseph B. Slater, Dexter, Mich.

[73] Assignee: Kaiser Optical Systems, Inc., Ann Arbor, Mich.

[21] Appl. No.: 09/036,152

[22] Filed: Mar. 6, 1998

Related U.S. Application Data

[60] Provisional application No. 60/039,962, Mar. 7, 1997.

[51] Int. Cl.$^7$ .................................. G01J 3/30; G01J 3/00
[52] U.S. Cl. ......................... 356/317; 356/318; 356/301
[58] Field of Search ................................. 356/301, 317, 356/318, 417

[56] References Cited

U.S. PATENT DOCUMENTS

| | | | |
|---|---|---|---|
| 3,631,254 | 12/1971 | Covault | 250/225 |
| 3,697,180 | 10/1972 | Mori | 356/301 |
| 3,817,634 | 6/1974 | Barron et al. | 356/301 |
| 5,116,121 | 5/1992 | Knoll et al. | 356/301 |
| 5,202,744 | 4/1993 | Louis | 356/417 |
| 5,418,797 | 5/1995 | Bashkansky et al. | 372/3 |
| 5,638,172 | 6/1997 | Alsmeyer et al. | 356/301 |
| 5,672,880 | 9/1997 | Kain | 250/458.1 |
| 5,754,289 | 5/1998 | Ozaki et al. | 356/301 |

OTHER PUBLICATIONS

Melles Griot 1995/96 Catalog, pp. 12–22 to 12–23.

*Primary Examiner*—Frank G. Font
*Assistant Examiner*—Zandra V. Smith
*Attorney, Agent, or Firm*—Gifford, Krass, Groh, Sprinkle, Anderson & Citkowski, PC

[57] ABSTRACT

In an optical measurement system of the type wherein a source of excitation radiation is directed along an excitation path to stimulate an optical emission from a sample along a collection path, the use of polarization-based beam splitting enables optical shutters to control selective polarization of the excitation and/or collection paths while maximizing overall optical alignment accuracy. In a preferred embodiment, polarization-based beam-splitting optics are disposed in one or both of the excitation and collection paths to divide that path into two orthogonally polarized paths, and a controllable optical blocking element is disposed in at least one of the orthogonally polarized paths, such that control of over transmission of that path results in control over polarization. Each polarization-based beam-splitting optic preferably takes the form of an integrated polarizing beamsplitter, and four such elements are used, two in each of the excitation and collection paths, to selectively establish four polarization states. The invention is useful in any type of induced emission arrangement, including Raman and fluorescence detection.

25 Claims, 2 Drawing Sheets

METHODS AND APPARATUS FOR OBTAINING A SELECTIVELY POLARIZED INDUCED EMISSION

REFERENCE TO RELATED APPLICATION

This application claims priority of U.S. provisional application Ser. No. 60/039,962, filed Mar. 7, 1997, the entire contents of which are incorporated herein by reference.

FIELD OF THE INVENTION

The present invention relates generally to induced optical emission such as that associated with Raman and fluorescence detection and, in particular, to methods and apparatus for selectively conditioning the excitation and/or collection associated with such processes on the basis of polarization.

BACKGROUND OF THE INVENTION

Certain forms of induced optical emission, including those associated with Raman detection, are very sensitive to light polarization. In particular, observations made with respect to polarization may be indicative of certain material characteristics such as the degree of crystallinity, which, in turn, may enable the researcher to deduce physical properties such as strength or ductility. As a consequence, it is desirable in many investigations of this type to either stimulate the material with light of a predetermined polarization, or view the induced emissions in terms of polarization, or both.

There do exist fiber-optic-based Raman probe configurations adapted for obtaining polarized data, including instruments now provided by the assignee of this invention. In general, these probes are based upon a counter-propagating backscatter arrangement, as shown schematically with FIG. 1, wherein an excitation beam 102 is merged with a collection path 104 through the use of a combining optic 106. This establishes a combined excitation/collection path 108, enabling sample optic 110 to direct excitation and collection with respect to a common point or localized area 112 of a sample 114.

Using this backscatter arrangement as a foundation, turning now to FIG. 2, polarization analyzers 202 and 204 are typically physically inserted into the collection and excitation path, respectively, as shown, enabling the probe to obtain polarized data. A significant amount of information can be gleaned by measuring all four polarization states, namely: (1) the polarization of both analyzers being vertical and parallel; (2) both analyzers horizontal and parallel; (3) vertical excitation with horizontal collection; and (4) horizontal excitation with vertical collection.

According to the current art, the analyzers 202 and 204 are rotated to obtain the different polarization states. This approach presents a number of drawbacks, however. First, such a method makes it difficult to maintain a precise alignment between the excitation and collection beams. In addition, to obtain the different polarization states, rotary encoders must be attached to the analyzers, and such configurations tend to be quite expensive. An additional problem results from intensity variation due to polarization and stabilities in the excitation path. As a further technical difficulty, if the system is fiber-optic-based, the excitation light delivered through the excitation fiber is elliptical rather than randomly polarized. As such, the major axis of this ellipticity tends to rotate as a function of minor stresses on the optical fiber. When a major axis is aligned with the analyzer, more light will be transmitted than when it is misaligned, resulting in intensity variations in the collected data.

SUMMARY OF THE INVENTION

In an optical measurement system of the type wherein a source of excitation radiation directed along an excitation path to stimulate an optical emission from a sample along a collection path, this invention facilitates selective polarization of the excitation and/or collection paths while maximizing overall optical alignment accuracy. Broadly, at least one beam-splitter and polarization means are supported in one or both of the excitation and collection paths to divide that path into two orthogonally polarized paths. A controllable optical blocking element is disposed in one or both of these orthogonally polarized paths, such that control over transmission results in control over polarization.

According to a preferred embodiment, the beam-splitter and polarization means are combined into a single polarizing beam-splitter optical unit, and four such units are used, two in each of the excitation and collection paths, to selectively establish four polarization states. Thus, one comprehensive system for obtaining an induced optical emission with respect to four polarization states according to the invention includes:

a first beam-splitter disposed in a primary excitation path to divide the primary excitation path into first and second linearly polarized excitation paths having polarization axes orthogonal to one another;

a second beam-splitter disposed in the primary excitation path to merge the differently polarized excitation paths back into the primary excitation path;

a third beam-splitter disposed in a primary collection path to divide the primary collection path into first and second linearly polarized collection paths having polarization axes orthogonal to one another;

a fourth beam-splitter disposed in the primary collection path to merge the differently polarized collection paths back into the primary collection path; and four controllable optical shutters, one disposed in each of the differently polarized excitation and collection paths, each shutter having an independent light-passing and light-blocking state enabling the shutters to be opened and closed in any combination.

Alternative embodiments are disclosed in relation to sample optics, measurement efficiency, and other factors. Preferably, optical means are provided for combining the primary excitation and collection paths into a combined excitation/collection path which may be directed onto the same localized region of the sample. The invention is useful in any type of induced emission arrangement, including Raman and fluorescence detection.

DETAILED DESCRIPTION OF THE INVENTION

Figure 1:
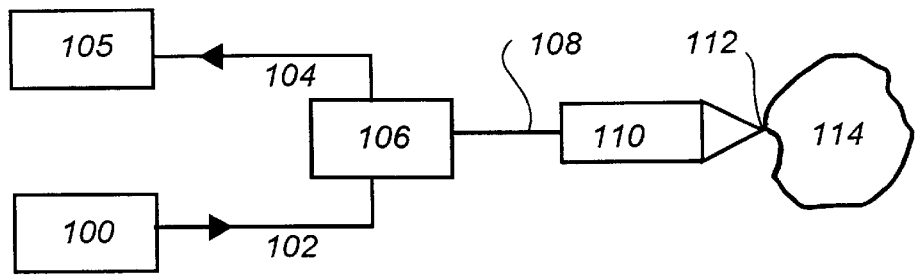
FIG. 1 is a schematic drawing of a prior-art backscatter geometry to which the invention is applicable.
Figure 2:
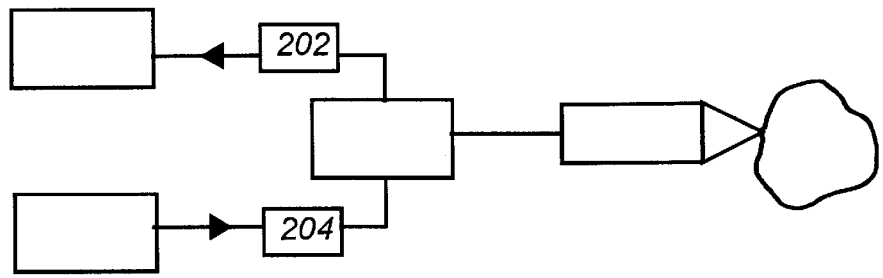
FIG. 2 is a schematic drawing of a prior-art fiber-optic probe utilizing rotatable polarization analyzers responsible for intensity variation in a collected signal.
Figure 3:
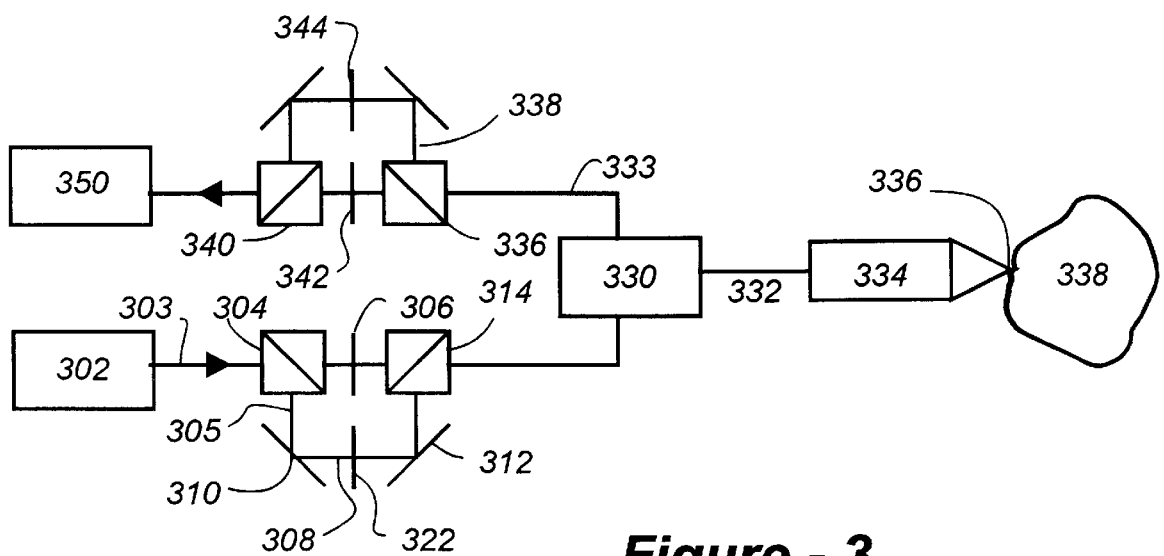
FIG. 3 is a schematic representation of a preferred embodiment according to the invention which utilizes a plurality of polarizing beam-splitters.

FIG. 3 illustrates a preferred embodiment of the invention based upon polarizing beam-splitters; that is, beam-splitters of the type wherein polarization of one axis is transmitted while polarization along an axis orthogonal to that transmitted is reflected along a separate optical path, generally in a direction perpendicular to the transmitted beam. Suitable polarizing beam-splitters are commercially available, and are provided in different forms, including those which provide a dielectric coating of some kind at the beam-splitter interface responsible for the selective transmission of a given polarization. Other available polarizing beam-splitters are based upon crystals, typically of calcite, which, through the action of the crystal itself, inherently separates a circularly or randomly polarized beam into parallel and perpendicular axes. Beam-splitters of the type incorporating a dielectric coating are available from such companies as Melles Griot, under the designation "Broadband Polarizing Cube Beamsplitters." Calcite-based units are available from such companies as Kriescher Co. and Meadowlark Optics.

Continuing the reference to FIG. 3, light from a source 302 is carried along a primary excitation path 303, and is characterized in being randomly, circularly or, perhaps, elliptically polarized. It is understood that the invention is applicable to light emanating from an optical fiber, in the case of a remote probe configuration or, alternatively, directly from a source such as a laser in a 'direct-coupled' configuration. In either case, this polarized excitation along path 303 is presented to a first polarizing beam-splitter 304 which passes polarized light of a first orientation while reflecting polarized light of an orthogonal orientation onto a secondary path 305. In accordance with the convention used by the suppliers of the polarizing beam-splitters, polarization parallel to the plane of incidence is that which is transmitted, whereas light of a polarization which is perpendicular to the plane of incidence is that which is reflected along secondary path 305. Conventions notwithstanding, for the purposes of this invention, suffice it to say that light of a first linear polarization is transmitted, whereas light of a second linear polarization orthogonal to the first linear polarization is reflected along the secondary path.

In this preferred configuration, the light along path 305 is merged back into the primary excitation path through the use of a pair of mirrors 310 and 312 and a second polarizing beam-splitter 314. The second polarizing beam-splitter 314 is essentially a mirror image of the first polarizing beam-splitter 304, in that light of the polarization which was reflected by the first beam-splitter to create the secondary path 305 is now reflected, thereby merged back into the excitation path.

In this configuration, a combining optic 330 may be used to create a combined excitation/collection path 332, enabling a sample lens 334 to focus both the excitation energy and the view of the emitted or scattered light to be detected with respect to a common point 336 on sample 338.

With respect to the counter-propagating aspect of the combined excitation/collection path 332, the optic 330 may be seen as providing a separated-out primary collection path 333 which, in this preferred embodiment, strikes a first polarizing beam-splitter 336 to create a secondary collection path 338 which is merged back into the primary collection path 333 through a set of mirrors and a second polarizing beam-splitter 340 in like manner to the geometry established in the excitation path. The collection path may then be routed to a utilization device 350 either by way of an optical conduit such as an optical fiber, or by coupling directly to the utilization device, which takes the form of a spectrograph in the case of an induced emission analysis.

In the preferred embodiment, four blocking means are used, two in each of the primary excitation and collection paths, and two in each of the secondary excitation and collection paths. With particular reference to FIG. 3, an optical blocking element 306 is used in the primary excitation path, element 322 is used in the secondary excitation path, element 342 is used in the primary collection path, and element 344 is used in the secondary collection path.

These elements may either be physically or electronically activated. That is, they may take the form of physical shutters or, alternatively, electronically controlled devices such as liquid-crystal light valves. Also, in the case of a physically mediated shutter control, pneumatically operated light valves may be used, enabling polarization selection even in a remote probe configuration without the use of electrical components, thereby avoiding situations wherein electrical currents or voltage peaks could have explosive or hazardous consequences.

Due to the creation of the secondary paths through the use of the polarizing beam-splitters, the blocking means may be activated without disturbing any of the precisely aligned optical paths of the arrangement overall. In particular, none of the beam-splitters need be moved, nor do any elements require rotation in order to selectively gather data with respect to all four of the polarization states defined above. Moreover, as a further convenience, with all of the optical blocking means in an open or transmissive state, a non-polarized excitation and collection arrangement is established.

Alternatively, the shutters on the excitation side may be left open, whereas the shutters on the collection side are used selectively, enabling the sample to be irradiated with randomly or circularly/elliptically polarized light, as the case may be, while being analyzed as a function of polarized light along a particular axis. For this reason, it should be noted that, depending upon the target application, the creation of a secondary path may only be applicable to one or the other (as opposed to both) of the excitation and collection paths, and in the event that it is known in advance that selective polarization is unnecessary in one direction, the optical elements associated with creating a secondary path may be eliminated all together.

Figure 4:
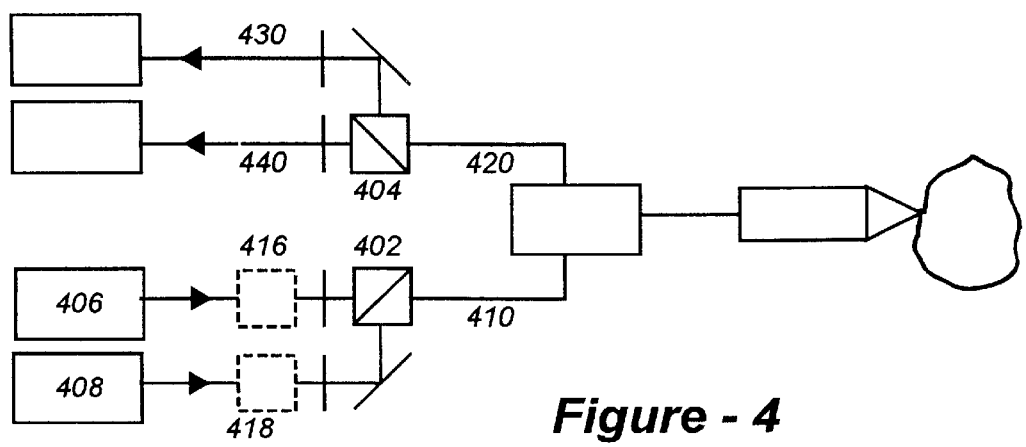
FIG. 4 is a schematic drawing which illustrates alternative embodiment of the invention wherein differently polarized light need not be merged into, or separated from, the excitation and collection paths, respectively.

Now turning to FIG. 4, as an alternative to the second beam-splitters 314 and 340 in the excitation and collection paths, respectively, only beam-splitters 402 and 404 are used, enabling excitation from two sources 406 and 408 to be merged into a combined excitation path 410, with conventional polarization analyzers being located in either or both positions 416 and 418, depending upon the desired function of beam-splitters 402. In like manner, the collection path 420, may be separated out on the basis of polarization using 404, and fed along different output channels 430 and 440. In contrast to the preferred embodiment of FIG. 3, wherein the shutters must be cycled in order to obtain all four polarization states, the configuration of FIG. 4 may be used at least in part to provide additional polarization states simultaneously, thereby enhancing throughput in certain applications.

Figure 5:
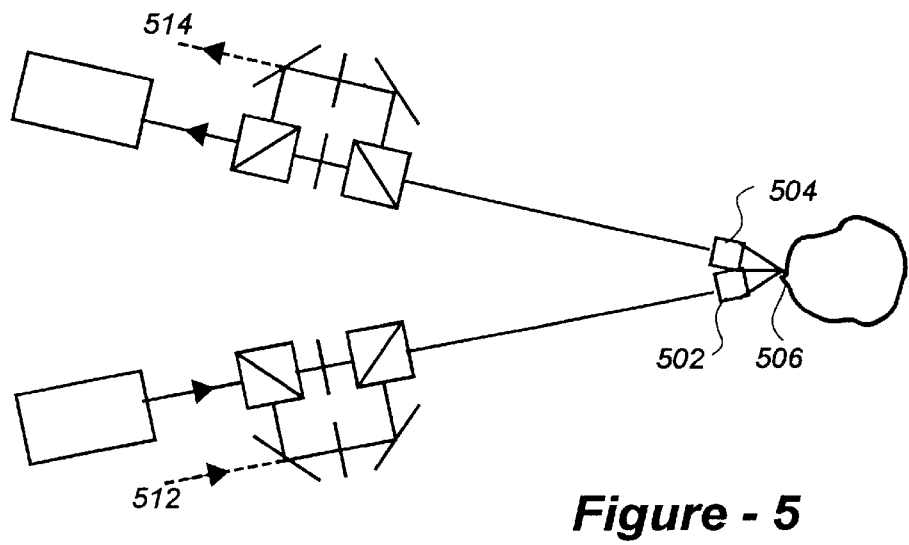
FIG. 5 is another alternative embodiment of the invention which uses separate optics to focus independent excitation and collection paths, as opposed to the creation of a combined excitation/collection path.

FIG. 5 is a drawing which illustrates an alternative embodiment of the invention, this diagram being used to show that a combined excitation/collection path is not necessarily required according to the invention but that, instead, the combination optic such as 330 in FIG. 3 may be eliminated, and that separate excitation and collection sample optics 502 and 504, respectively may be used with respect to the same sample point 506. It should also be mentioned that, in this embodiment and all others disclosed herein, although the sample points are shown with respect to the surface of the sample under investigation, such a point or localized area may be located within the sample, particularly in the case of gas, liquid or transparent solid material. The broken lines 512 and 514 indicate that, as an alternative to four beam-splitters, a fewer number may be used in accordance with the principles of independently polarized excitation and/or collection, as discussed with reference to FIG. 4.

Figure 6:
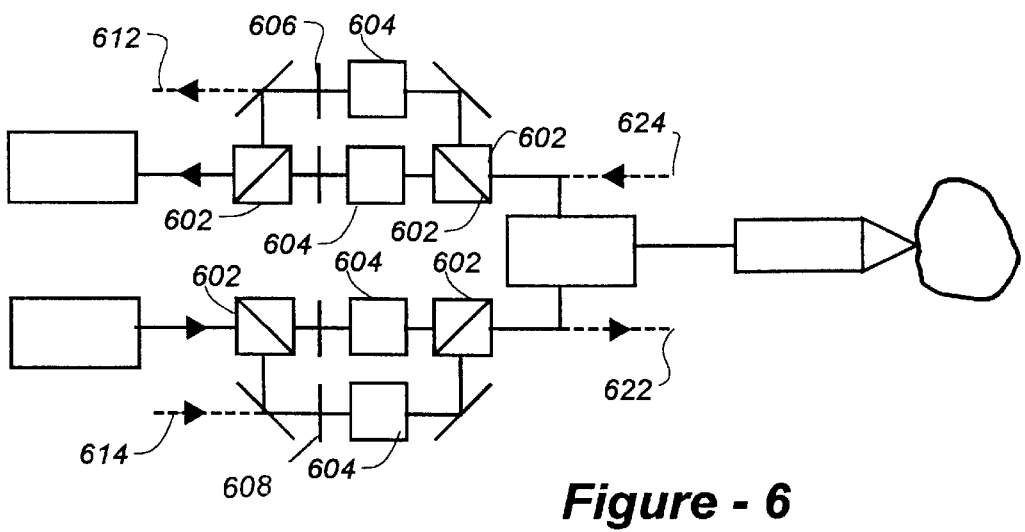
FIG. 6 is yet a further alternative embodiment of the invention, wherein non-polarizing beam-splitters are used to create secondary optical paths into which conventional polarizing analyzers are selectively enabled through the control of optical blocking means.

As shown in FIG. 6, the invention is not limited to the use of polarizing beam-splitters, so long as the basic tenet is met that selectively polarized paths are created then passed or blocked in accordance with a desired analytical situation. Thus, conventional beam-splitters 602 may be used in conjunction with conventional polarization analyzers 604 to create two or more paths into which blocking element, such as 606 and 608 are inserted, thereby obtaining the desired effect of FIG. 3, but without the use of polarizing beam-splitters. Again, dashed lines 612 and 614 are used to illustrate the use of non-merged excitation and/or collection paths, as introduced with respect to FIG. 4, whereas broken lines 622 and 624 are used to indicate that a combined excitation/collection path need not be established according to the invention, a concept which was also discussed with reference to FIG. 5.

What is claimed is:

1. A system for obtaining a selectively polarized induced emission, comprising:
    a source of excitation radiation directed along a primary excitation path to stimulate an optical emission from a sample along a primary collection path;
    a beam-splitter disposed in the primary excitation path, the beam-splitter being operative to merge a secondary excitation path into the primary excitation path on the basis of linear polarization; and
    selectable optical blocking means disposed in at least one of the primary and secondary excitation paths.

2. The system of claim 1, wherein the beam-splitter is a polarizing beam-splitter.

3. The system of claim 1, further including a second beam-splitter disposed in the primary excitation path to form the secondary excitation path.

4. The system of claim 3, wherein the second beam-splitter is a polarizing beam-splitter.

5. The system of claim 1, wherein the optical emission is representative of a Raman emission.

6. The system of claim 1, wherein the optical emission is representative of a fluorescence emission.

7. The system of claim 1, including electronically operated selectable optical blocking means.

8. The system of claim 1, including pneumatically operated selectable optical blocking means.

9. A system for obtaining an induced optical emission with respect to four polarization states, comprising:
    a source of excitation radiation directed along a primary excitation path to stimulate an optical emission from a sample along a primary collection path;
    a first beam-splitter disposed in the primary excitation path to divide the primary excitation path into first and second linearly polarized excitation paths having polarization axes orthogonal to one another;
    a second beam-splitter disposed in the primary excitation path to merge the differently polarized excitation paths back into the primary excitation path;
    a third beam-splitter disposed in the primary collection path to divide the primary collection path into first and second linearly polarized collection paths having polarization axes orthogonal to one another;
    a fourth beam-splitter disposed in the primary collection path to merge the differently polarized collection paths back into the primary collection path; and
    four controllable optical shutters, one disposed in each of the differently polarized excitation and collection paths, each shutter having an independent light-passing and a light-blocking state enabling the shutters to be opened and closed in any combination.

10. The system of claim 9, wherein at least one of the beam-splitters is a polarizing beam-splitter.

11. The system of claim 9, further including optical means for combining the primary excitation and collection paths into a combined excitation/collection path directed onto the same localized region of the sample.

12. The system of claim 9, wherein the optical emission is representative of a Raman emission.

13. The system of claim 9, wherein the optical emission is representative of a fluorescence emission.

14. A system for obtaining a selectively polarized induced emission, comprising:
    a source of excitation radiation directed along a primary excitation path to stimulate an optical emission from a sample along a primary collection path;
    a beam-splitter disposed in the primary collection path, the beam-splitter being operative to merge a secondary collection path into the primary collection path on the basis of linear polarization; and
    selectable optical blocking means disposed in at least one of the primary and secondary collection paths.

15. The system of claim 14, wherein the beam-splitter is a polarizing beam-splitter.

16. The system of claim 14, further including a second beam-splitter disposed in the primary collection path to form the secondary collection path.

17. The system of claim 16, wherein the second beam-splitter is a polarizing beam-splitter.

18. The system of claim 14, wherein the optical emission is representative of a Raman emission.

19. The system of claim 14, wherein the optical emission is representative of a fluorescence emission.

20. The system of claim 14, including electronically operated selectable optical blocking means.

21. The system of claim 14, including pneumatically operated selectable optical blocking means.

22. a system for obtaining a selectively polarized emisson, comprising:
    a source of excitation radiation directed along a primary excitation path to stimulate an optical emission from a sample along a primary collection path;
    optical means for combining the primary excitation and collection paths into a combined a excitation/collection path directed onto the same localized region of the sample;

a beam-splitter disposed in at least one of the primary excitation and collection paths to interact with a respective secondary path established on the basis of linear polarization; and selectable optical blocking means disposed in at least one of the primary and secondary excitation and collection paths.

23. The system of claim 22, wherein the secondary path is a secondary excitation path established by placing a second beam-splitter in the primary excitation path.

24. The system of claim 22, wherein the secondary path is a secondary collection path established by placing a second beam-splitter in the primary collection path.

25. The system of claim 22, wherein the optical emission is representative of a Raman or fluorescence emission.

* * * * *

UNITED STATES PATENT AND TRADEMARK OFFICE
Certificate

Patent No. 6,124,928

Patented: September 26, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Michael J. Pelletier, Saline, MI; and Joseph B. Slater, Dexter, MI.

Signed and Sealed this Twentieth Day of November 2001.

FRANK G. FONT
*SPE 2877*
Examining Group 2870